(12) United States Patent
Kageyama et al.

(10) Patent No.: US 8,180,110 B2
(45) Date of Patent: May 15, 2012

(54) ROAD LANE MARKER DETECTION APPARATUS AND ROAD LANE MARKER DETECTION METHOD

(75) Inventors: Shioya Kageyama, Toyota (JP); Tomoyasu Tamaoki, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 347 days.

(21) Appl. No.: 12/627,512

(22) Filed: Nov. 30, 2009

(65) Prior Publication Data

US 2010/0188507 A1 Jul. 29, 2010

(30) Foreign Application Priority Data

Jan. 23, 2009 (JP) ................................. 2009-013172

(51) Int. Cl.
*G06K 9/00* (2006.01)
(52) U.S. Cl. ......... 382/104; 382/148; 382/190; 348/148
(58) Field of Classification Search .................. 348/148; 382/104, 148, 190
See application file for complete search history.

(56) References Cited

U.S. PATENT DOCUMENTS

| | | | | |
|---|---|---|---|---|
| 5,555,555 | A * | 9/1996 | Sato et al. ...................... | 382/104 |
| 8,090,152 | B2 * | 1/2012 | Kageyama et al. ........... | 382/104 |
| 8,116,523 | B2 * | 2/2012 | Amagasaki .................... | 382/104 |
| 2002/0081001 | A1 * | 6/2002 | Tsuji ............................ | 382/104 |
| 2005/0135658 | A1 * | 6/2005 | Yamamoto et al. ........... | 382/104 |
| 2009/0028388 | A1 * | 1/2009 | Amagasaki .................... | 382/104 |
| 2009/0041337 | A1 * | 2/2009 | Nakano ......................... | 348/148 |

FOREIGN PATENT DOCUMENTS

| | | |
|---|---|---|
| JP | 2002-133595 A | 5/2002 |
| JP | 2005-182303 | 7/2005 |
| JP | 2007-72512 A | 3/2007 |
| JP | 2007-141052 | 6/2007 |
| JP | 2008-30619 A | 2/2008 |

OTHER PUBLICATIONS

Wu et al., "Robust Lane Detection and Tracking for Driving Assistance Systems", 2007, IEEE.*
Wang, et al., "Lane Marker Detection Based on Consecutive Threshold Segementation", Apr. 2011, Journal of Information and Computing Science.*
Cheng et al., "Hierarchical Lane Detection for Different Types of Roads", 2008, IEEE.*
Aly, Mohamed, "Real Time Detection of Lane Markers in Urban Streets", 2007, California Institute of Technology.*
Office Action issued Dec. 17, 2010, in Japanese Patent Application No. 2009-013172 with Englisn translation.

* cited by examiner

*Primary Examiner* — Ramy M Osman
(74) *Attorney, Agent, or Firm* — Oblon, Spivak, McClelland, Maier & Neustadt, L.L.P.

(57) ABSTRACT

A road lane marker detection apparatus includes an imaging portion that captures an image of the road surface such that a first road lane marker and a second road lane marker are captured in the image; a feature point obtaining portion that obtains feature points of the road lane markers; a storing portion that stores the feature points obtained; and a lane marker detecting portion that detects the road lane markers. The storing portion includes a first storage area in which the feature points of the first road lane marker are stored and a second storage area in which the feature points of the second road lane marker are stored. The number of feature points able to be stored in the first storage area and the number of feature points able to be stored in the second storage area are set independently of one another.

16 Claims, 6 Drawing Sheets

ROAD LANE MARKER DETECTION APPARATUS AND ROAD LANE MARKER DETECTION METHOD

INCORPORATION BY REFERENCE

The disclosure of Japanese Patent Application No. 2009-013172 filed on Jan. 23, 2009 including the specification, drawings and abstract is incorporated herein by reference in its entirety.

BACKGROUND OF THE INVENTION

1. Field of the Invention

The invention relates to a road lane marker detection apparatus and a road lane marker detection method. More particularly, the invention relates to a road lane marker detection apparatus and road lane marker detection method capable of more reliably detecting a line lane marker and a dotted lane marker even if one of the road lane markers, from among a road lane marker on the left side of the vehicle and a road lane marker on the right side of the vehicle, is a line lane marker such as a white line and the other road lane marker is a dotted lane marker formed by Botts' dots or the like.

2. Description of the Related Art

In recent years, drive assist systems such as a lane keeping assist system (LKA) have been developed to reduce the load on the driver of a vehicle. The lane keeping assist system is provided with an imaging portion that captures an image of a road lane marker such as a white line using an on-board camera, a feature point obtaining portion that obtains feature points of the road lane markers based on the obtained captured image, a lane marker detecting portion that detects a road lane marker based on the obtained feature points, and a handling assist portion that assists with handling based on the positional relationship between the detected road lane marker and the host vehicle.

A road lane marker is the line that demarcates a running lane. One running lane is demarcated by two road lane markers, one on the right side of the vehicle and one on the left side of the vehicle. The road lane marker is typically a line lane marker such as a white line or a yellow line. However, in the United States, there are also dotted lane markers that are formed by a series of round raised road markers referred to as Botts' dots. Moreover, in Japan and the United States there are dotted lane markers that are formed by a series of round raised road markers referred to as cat's eyes. Hereinafter, white lines and yellow lines will hereinafter collectively be referred to as "white line or the like," and Botts' dots and cat's eyes will collectively be referred to as "Botts' dots or the like."

Compared to a white line or the like, Botts' dots or the like have low contrast with asphalt and have poor continuity in the length direction of the road. Consequently, they are not as visible as a white line. Therefore, in order to detect a road lane marker based on a captured image, it is preferable to use a different method to analyze an image for a white line or the like than is used to analyze an image for Botts' dots or the like. This is because the detection accuracy may decrease if an attempt is made to uniformly detect both a white line or the like and Botts' dots or the like using the same method of analysis.

First, an example of a method for detecting a white line or the like will be described. The feature points of a line lane marker such as a white line or the like are the points that form the outline of the line lane marker. In the lane keeping assist system, the feature point obtaining portion obtains the feature points by detecting the contrast in the luminance at the boundary between the asphalt and the line lane marker. The feature point obtaining portion searches for the feature points in each row of pixels in the width direction of the road in a predetermined region that includes the road lane marker on the left side of the vehicle and the road lane marker on the right side of the vehicle. The feature point obtaining portion searches the rows of pixels discontinuously (discretely) in the length direction of the road. Accordingly, a low density search for the feature points is conducted in the predetermined region. The reason for this is that the continuity of a white line or the like is high so many feature points can be obtained, and thus the accuracy with which a white line or the like can be detected is high, even if the feature points are detected with a low density search. The lane marker detecting portion obtains a line that resembles a row of feature points by performing a calculation such as a Hough conversion on the obtained feature points. As a result, the lane marker detecting portion detects a line lane marker.

Next, an example of a method for detecting Botts' dots or the like will be described. The feature points of a dotted lane marker formed by Botts' dots or the like are the points that form the outline of the Botts' dots or the like. In the lane keeping assist system, the feature point obtaining portion obtains the feature points by performing a morphological operation on the captured image. The feature point obtaining portion searches for the feature points in each row of pixels in the width direction in a predetermined region that includes the road lane marker on the left side of the vehicle and the road lane marker on the right side of the vehicle. The feature point obtaining portion searches the rows of pixels continuously in the length direction of the road. Accordingly, a high density search is conducted for the feature points in the predetermined region. The reason for this is that the continuity of Botts' dots or the like is poor so a sufficient number of feature points cannot be obtained, and thus Botts' dots or the like cannot be reliably detected, unless a high density search for the feature points is conducted. The feature point obtaining portion detects a dotted lane marker based on the obtained feature points.

When both the road lane marker on the left side of the vehicle and the road lane marker on the right side of the vehicle are white lines or the like, the road lane markers may be detected using the method for detecting a white line or the like described above. Also, when both the road lane marker on the left side of the vehicle and the road lane marker on the right side of the vehicle are formed by Botts' dots or the like, the road lane markers may be detected using the method for detecting Botts' dots or the like described above.

Botts' dots or the like are provided in a location between lanes on a road with a plurality of lanes in one direction, but are not provided on either edge of the road, i.e., in a location that separates a running lane from the shoulder of the road (i.e., along the edge of the road). A white line or the like is provided on both edges of the road. Therefore, the road lane marker on one side of both the left and right lanes is a white line or the like and the road lane marker on the other side of both the left and right lanes is formed by Botts' dots or the like. Typically in this case, the white line or the like is detected by the method for detecting a white line or the like described above and the Botts' dots or the like are detected by the method for detecting Botts' dots or the like described above.

In this case, the captured image received by the feature point obtaining portion includes both the white lines or the like and the Botts' dots or the like. As described above, with the method for detecting the Botts' dots or the like, a high density search for the feature points is conducted in a predetermined region of the captured image. Considering the processing speed of the CPU, an upper limit value is set for the number of feature points obtained per one frame of the image, and this upper limit value is set at a total value for the combined number of feature points of the road lane marker on the left side of the vehicle and the road lane marker on the right side of the lane marker. Therefore, if an extremely large number of feature points are obtained at a white line or the like, which has high continuity, and the number of feature points ends up exceeding the upper limit value before the number of feature points necessary to detect a dotted lane marker at Botts' dots or the like, which have poor continuity, is obtained, the feature point obtaining process will end up stopping at that point. If this happens, a dotted lane marker that is formed by Botts' dots or the like may not be able to be detected.

Japanese Patent Application Publication No. 2005-182303 (JP-A-2005-182303) describes an invention related to a Botts' dots detection apparatus. However, with this apparatus as well, the problem described above still arises when one road lane marker is a white line or the like and the other road lane marker is formed by Botts' dots.

SUMMARY OF THE INVENTION

The invention provides a road lane marker detection apparatus and a road lane marker detection method capable of more reliably detecting a line lane marker and a dotted lane marker even if one of a right or left lane marker of a lane is a line lane marker such as a white line or the like and the other lane marker is a dotted lane marker formed by Botts' dots or the like.

A first aspect of the invention relates to a road lane marker detection apparatus which detects a road lane marker on a road. This road lane marker detection apparatus includes an imaging portion, a feature point obtaining portion, a storing portion, and a lane marker detecting portion. The imaging portion captures an image of the road surface such that a first road lane marker provided on the left side of a lane to demarcate the left side of the lane and a second road lane marker provided on the right side of the lane to demarcate the right side of the lane are captured in the image. The feature point obtaining portion obtains feature points of the first road lane marker and the second road lane marker based on the captured image obtained by the imaging portion. The storing portion stores the feature points obtained by the feature point obtaining portion. The lane marker detecting portion detects the first road lane marker and the second road lane marker based on the feature points read from the storing portion. The storing portion includes a first storage area in which the feature points of the first road lane marker are stored and a second storage area in which the feature points of the second road lane marker are stored. The number of feature points able to be stored in the first storage area and the number of feature points able to be stored in the second storage area are set independently of one another.

With the road lane marker detection apparatus according to the first aspect described above, the storing portion includes a first storage area in which the feature points of the first road lane marker are stored and a second storage area in which the feature points of the second road lane marker are stored, and the number of feature points able to be stored in the first storage area and the number of feature points able to be stored in the second storage area are set independently of one another. Therefore, even if the first road lane marker is a white line and the second road lane marker is a raised road marker formed by Botts' dots, for example, a sufficient number of feature points of the Botts' dots are able to be stored in the second storage area regardless of the number of feature points of the white line stored in the first storage area. Accordingly, a road lane marker formed by Botts' dots can be more reliably detected even when the first road lane marker is a white line and the second road lane marker is formed by Botts' dots. Also, the white line has high continuity so the road lane marker detection apparatus is still able to sufficiently detect the white line even if the number of obtained feature points of the white line has reached the upper limit value and some of the feature points are unable to be obtained.

A second aspect of the invention relates to a road lane marker detection apparatus which detects a road lane marker on a road. This road lane marker detection apparatus includes an imaging portion, a feature point obtaining portion, a managing portion, and a lane marker detecting portion. The imaging portion captures an image of the road surface such that a first road lane marker provided on the left side of a lane to demarcate the left side of the lane and a second road lane marker provided on the right side of the lane to demarcate the right side of the lane are captured in the image. The feature point obtaining portion obtains feature points of the first road lane marker and the second road lane marker based on the captured image obtained by the imaging portion. The managing portion manages the feature points obtained by the feature point obtaining portion divided into feature points of the first road lane marker and feature points of the second road lane marker. The lane marker detecting portion detects the first road lane marker and the second road lane marker based on the feature points of the first road lane marker and the feature points of the second road lane marker managed by the managing portion.

With the road lane marker detecting apparatus according to the second aspect described above, the managing portion manages the feature points obtained by the feature point obtaining portion divided into feature points of the first road lane marker and feature points of the second road lane marker. Therefore, even if the first road lane marker is a white line and the second road lane marker is formed by Botts' dots, for example, the road lane markers are able to be managed separately so the second road lane marker formed by Botts' dots, as well as the first road lane marker formed by the white line, can be more reliably detected.

A third aspect of the invention relates to a road lane marker detection method for detecting a road lane marker on a road. This road lane marker detection method includes capturing an image of the road surface such that a first road lane marker provided on the left side of a lane to demarcate the left side of the lane and a second road lane marker provided on the right side of the lane to demarcate the right side of the lane are captured in the image; obtaining feature points of the first road lane marker and the second road lane marker based on the obtained captured image; storing the obtained feature points divided into feature points of the first road lane marker that are stored in a first storage area and feature points of the second road lane marker that are stored in a second storage area; setting the number of feature points able to be stored in the first storage area and the number of feature points able to be stored in the second storage area independently of one another; and detecting the first road lane marker and the second road lane marker based on the stored feature points.

With the road lane marker detection method according to the third aspect as well, the same effects as those obtained by the road lane marker detection apparatus according to the first aspect are able to be obtained.

Thus, the road lane marker detection apparatus and the road lane marker detection method according to the aspects of the invention make it possible to more reliably detect a line lane marker and a dotted lane marker even if one of a right or left lane marker of a lane is a line lane marker such as a white line or the like and the other lane marker is a dotted lane marker formed by Botts' dots or the like.

BRIEF DESCRIPTION OF THE DRAWINGS

The foregoing and/or further objects, features and advantages of the invention will become more apparent from the following description of example embodiments with reference to the accompanying drawings, in which like numerals are used to represent like elements and wherein.

DETAILED DESCRIPTION OF EMBODIMENTS

Figure 1:
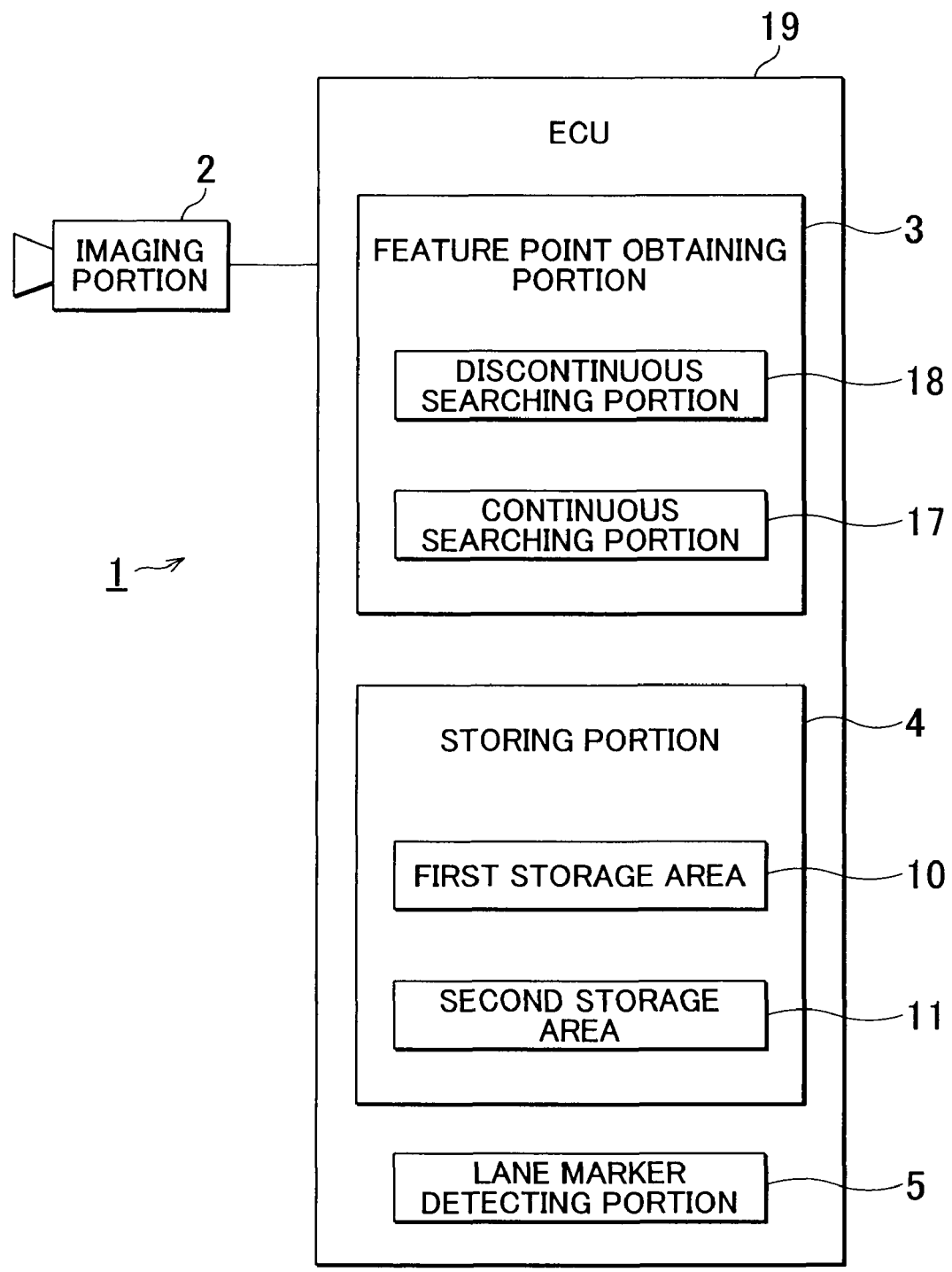
FIG. 1 is a block diagram of a road lane marker detection apparatus according to one example embodiment of the invention.
Figure 2:
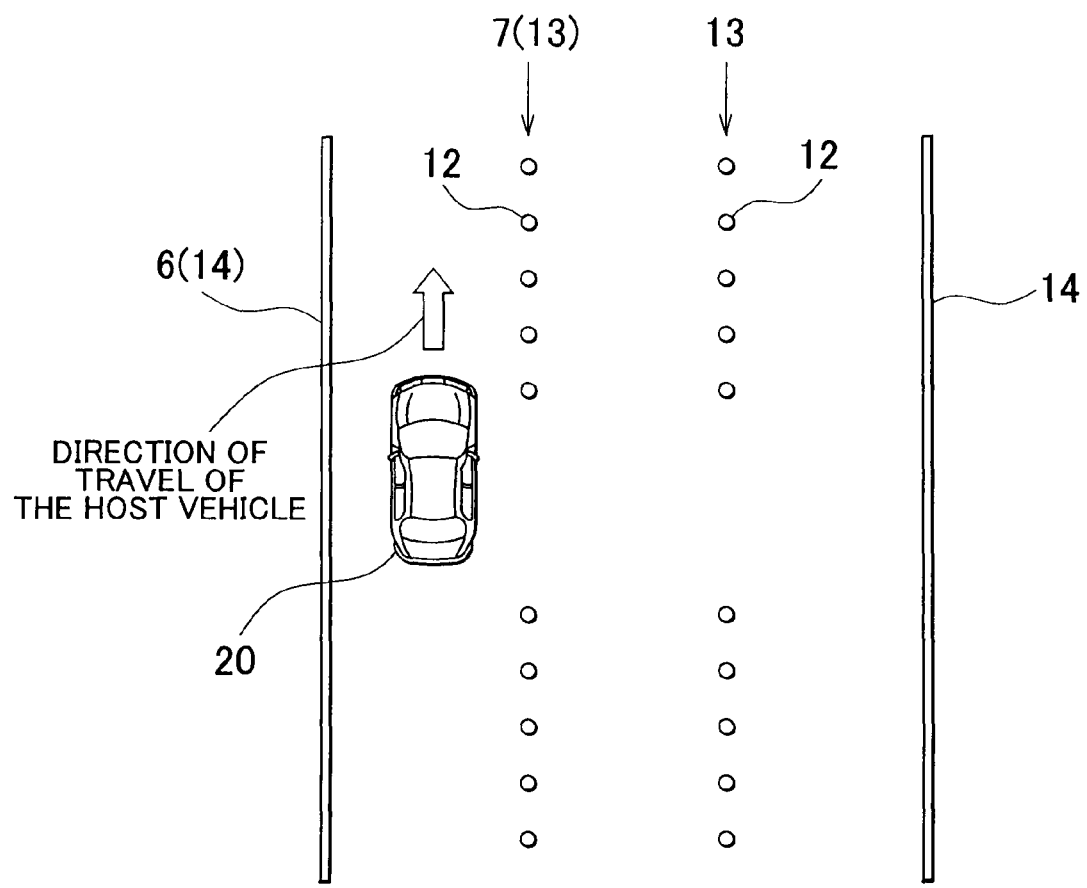
FIG. 2 is a plan view of a road with three lanes in one direction in which the road lane markers on the edges of the road (the road boundary markers) are line lane markers and the road lane markers at the lane boundaries (lane boundary markers) are dotted lane markers.
Figure 3:
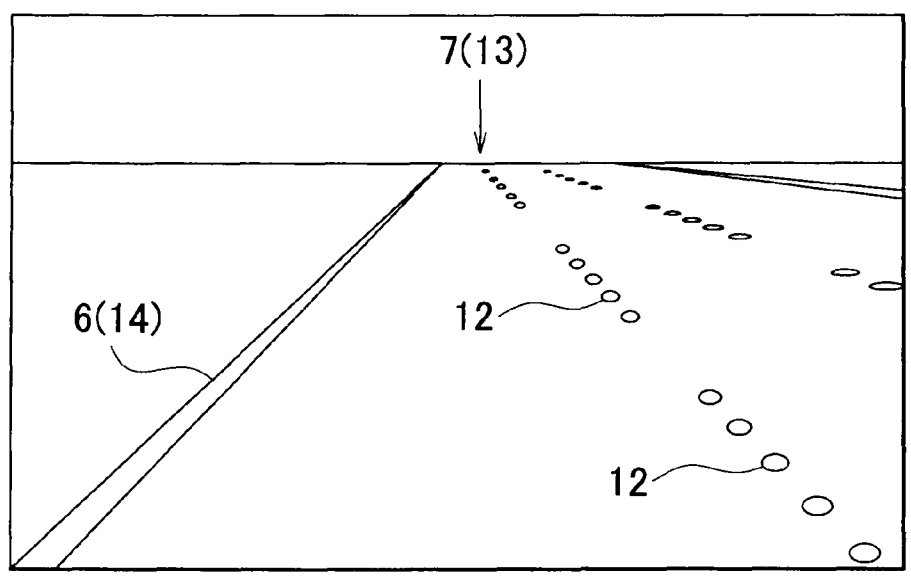
FIG. 3 is a view of a captured image when the road shown in FIG. 2 is captured by a camera.
Figure 4:
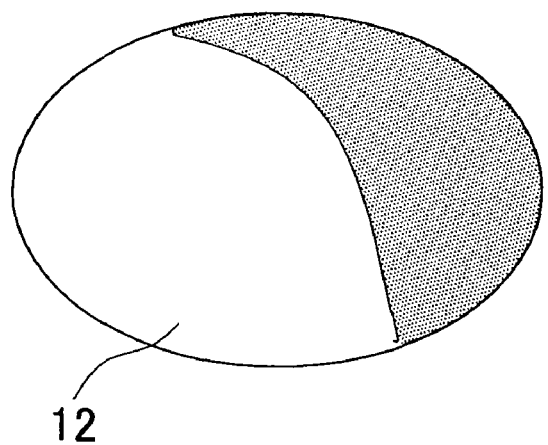
FIG. 4 is a view of a Botts' dot.

A road lane marker detection apparatus according to one example embodiment of the invention will now be described with reference to the accompanying drawings. FIG. 1 is a block diagram of a road lane marker detection apparatus according to the example embodiment. FIG. 2 is a plan view of a road with three lanes in one direction in which the road lane markers on the edges of the road (the road boundary markers) are line lane markers and the road lane markers at the lane boundaries (lane boundary markers) are dotted lane markers. FIG. 3 is a view of a captured image when the road shown in FIG. 2 is captured by a camera, and FIG. 4 is a view of a Botts' dot.

The road lane marker detection apparatus 1 according to this example embodiment is an apparatus that detects a road lane marker on a road. The road lane marker detection apparatus 1 is provided in a host vehicle 20 (see FIG. 2). In the example described below, the host vehicle 20 is traveling on a road with a plurality of lanes in one direction. In the example shown in FIG. 2, the road has three lanes in one direction.

The road lane marker detection apparatus 1 includes an imaging portion 2, a feature point obtaining portion 3, a storing portion 4, and a lane marker detecting portion 5. The feature point obtaining portion 3, the storing portion 4, and the lane marker detecting portion 5 are all provided in an ECU (Electronic Control Unit) 19.

The imaging portion 2 captures an image of the road surface so as to include a road lane marker on the left side of the host vehicle 20 which demarcates the left side of the running lane that the host vehicle 20 is traveling in, and a road lane marker 7 on the right side of the host vehicle 20 which demarcates the right side of the running lane that the host vehicle 20 is traveling in, as shown in the example in FIG. 3. The imaging portion 2 is arranged inside the vehicle cabin near the upper portion of the front windshield of the host vehicle 20, for example, and captures an image of the area in front of the host vehicle 20. The type of imaging portion 2 is not particularly limited and may be a CCD camera or a CMOS camera, for example. The road lane markers 6 and 7 may be dotted lane markers 13 formed by Botts' dots 12 (see FIG. 4) or cat's eyes (not shown), or line lane markers 14 formed by a while line or a yellow line. As shown in FIG. 4, the Botts' dots 12 are round raised road markers that have a diameter of approximately 10 cm and are made of ceramic or the like. The right side of the Botts' dot 12 shown in FIG. 4 is shaded. Cat's eyes are square raised road markers that are made of an aluminum alloy or the like.

The dotted lane markers 13 are provided at the lane boundaries on a road having a plurality of lanes in one direction, but are not provided on the edges of the road. The line lane markers 14 are provided on the edges of the road. Therefore, as shown in FIG. 2, on a road having a plurality of lanes in one direction, the road lane marker on one side of each outside lane (i.e., the outside left lane and the outside right lane) is a line lane marker 14, and the road lane marker on the other side of each of those lanes is a dotted lane marker 13. In the example shown in FIG. 3, with the left outside lane, the road lane marker 6 on the left side is a line lane marker 14 and the road lane marker 7 on the right side is a dotted lane marker 13. Also, with the right outside lane, the road lane marker 6 on the left side is a dotted lane marker 13 and the road lane marker 7 on the right side is a line lane marker 14. Also, with the center lane, the road lane marker 6 on the left side and the road lane marker 7 on the right side are both dotted lane markers 13.

Figure 6:
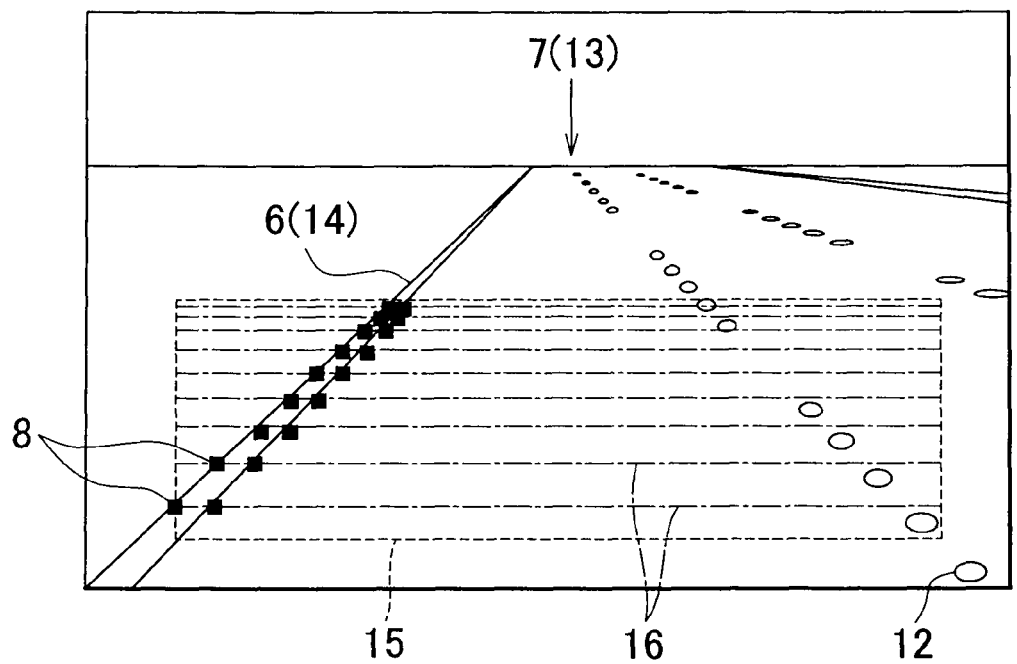
FIG. 6 is view of feature points detected by the discontinuous searching portion in the example embodiment of the invention.
Figure 8:
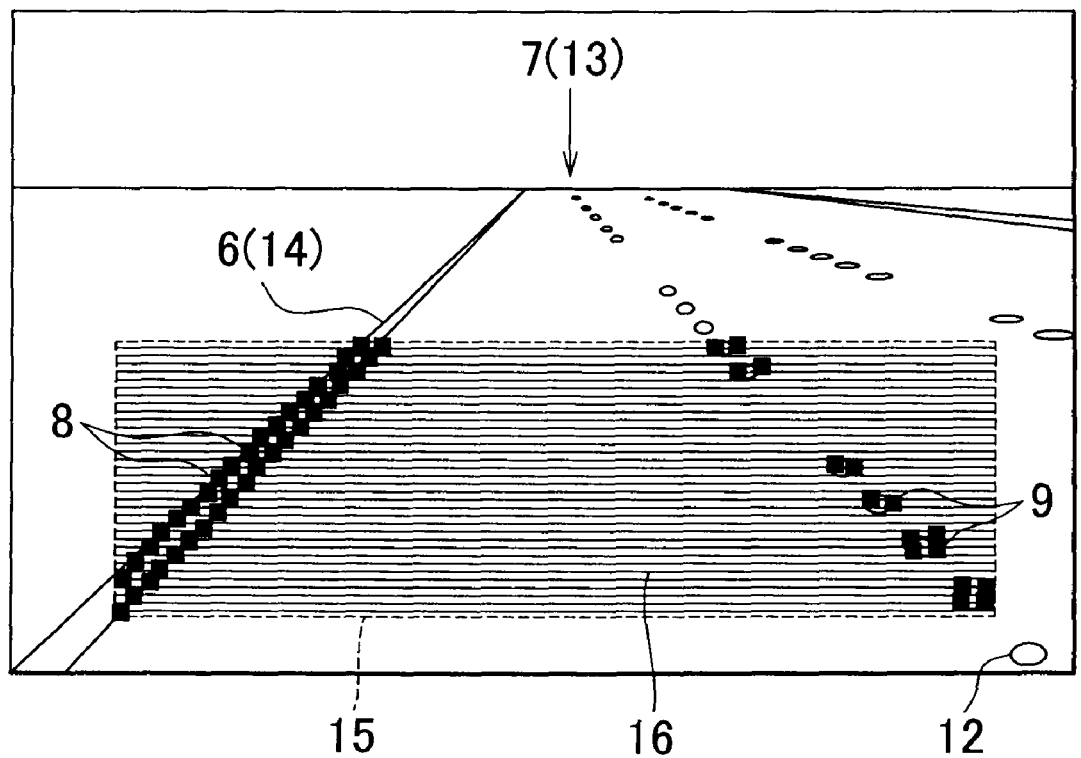
FIG. 8 is a view of feature points detected by the continuous searching portion in the example embodiment of the invention.

The feature point obtaining portion 3 obtains feature points 8 (see FIG. 6) of the road lane marker 6 on the left side and feature points 9 (see FIG. 8) of the road lane marker 7 on the right side based on the captured image obtained by the imaging portion 2. The feature point obtaining portion 3 includes a continuous searching portion 17 and a discontinuous searching portion 18.

Figure 5:
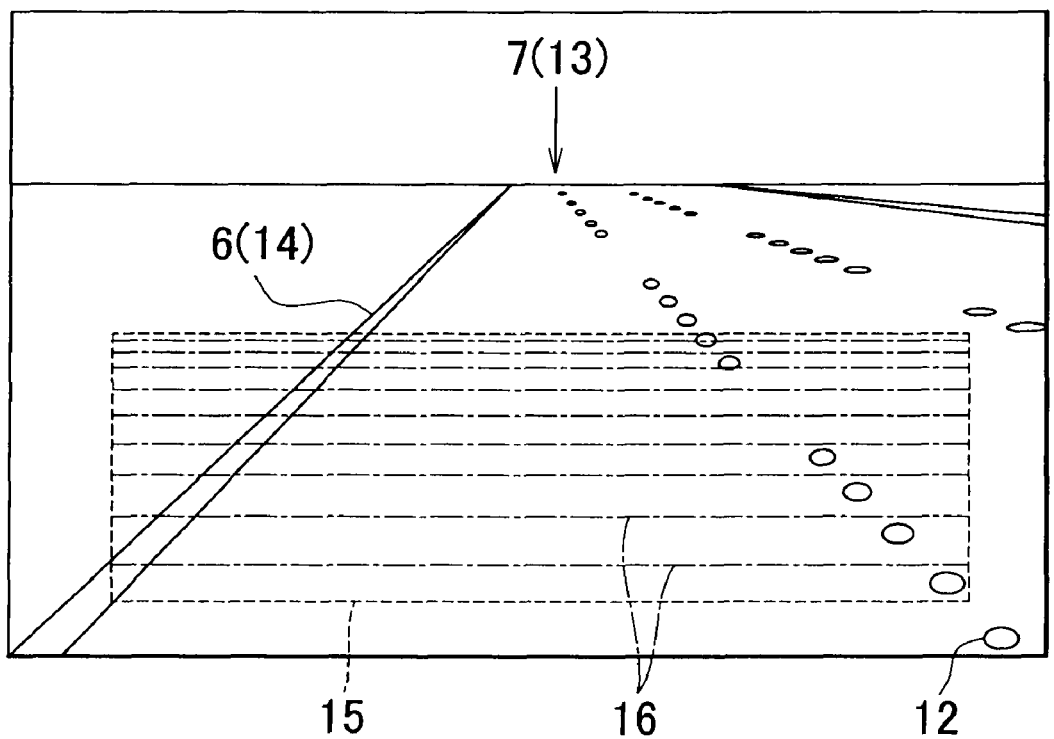
FIG. 5 is a view illustrating the manner in which the rows of pixels searched by a discontinuous searching portion are discontinuous (i.e., discrete) in the length direction of the road in the example embodiment of the invention.

The function of the discontinuous searching portion 18 is mainly to obtain the feature points of a line lane marker 14 formed by a solid or broken line such as a white line or the like. The discontinuous searching portion 18 searches for the feature points 8 and 9 to detect the road lane markers 6 and 7 on the left and right sides of the host vehicle 20, in each row of pixels 16 in a predetermined region 15 (see FIG. 5) that includes the road lane marker 6 on the left side of the host vehicle 20 and the road lane marker 7 on the right side of the host vehicle 20 in the captured image. As shown in the example in FIG. 5, the discontinuous searching portion 18 searches the rows of pixels 16 discontinuously (discretely) in the length direction of the road. Therefore, the search for the feature points 8 and 9 is a low density search. A white line or the like has high continuity so even if the feature points are detected by a low density search, many feature points can still be obtained, so the accuracy with which a white line or the like can be detected is high. The intervals of the rows of pixels 16 searched by the discontinuous searching portion 18 become gradually wider from the farthest portion toward the nearest portion, as shown in the example in FIG. 5. In this case, the farthest portion refers to the portion that is farthest from the host vehicle 20 in the predetermined region 15, and the nearest portion refers to the portion that is nearest to the host vehicle 20 in the predetermined region 15. As a result of the search, the discontinuous searching portion 18 obtains the feature points of the line lane marker 14 (i.e., the feature points 8 in the example in FIG. 6). Incidentally, on a curved road, the curvature as viewed in the captured image seems to increase farther away from the host vehicle. Accordingly, the intervals of the rows of pixels that are searched are gradually made narrower toward the farthest portion, so the accuracy with which a line lane marker such as a white line or the like is detected can be increased with good overall balance from the farthest portion to the nearest portion.

The discontinuous searching portion 18 obtains the feature points by detecting the contrast of the luminance at the boundary between the asphalt and the line lane marker 14. The discontinuous searching portion 18 obtains a line that resembles a row of feature points by performing a calculation such as a Hough conversion on the obtained feature points. As a result, the discontinuous searching portion 18 detects the line lane marker 14.

Figure 7:
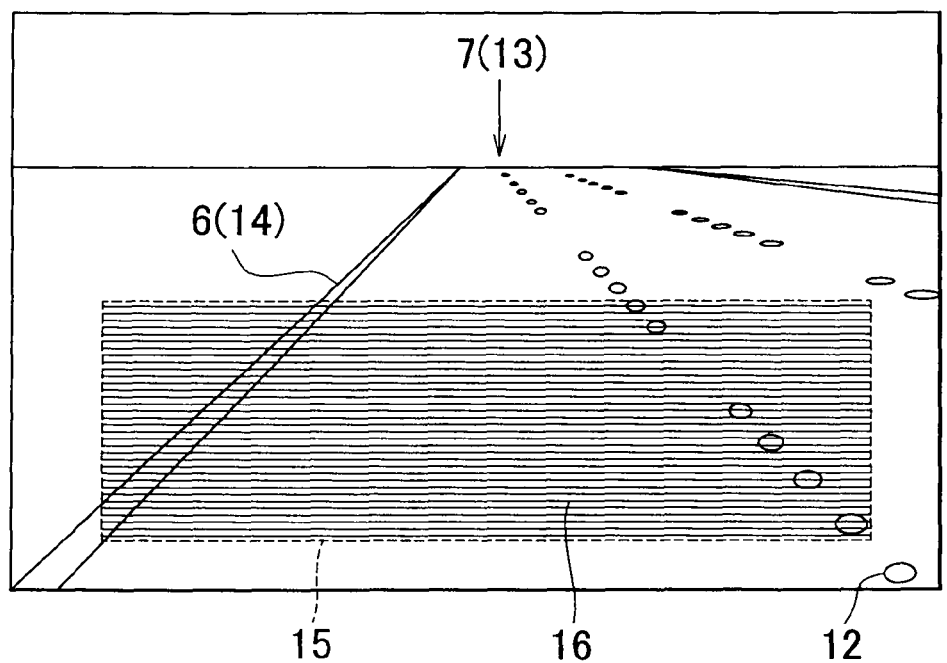
FIG. 7 is a view illustrating the manner in which the rows of pixels searched by a continuous searching portion are continuous in the length direction of the road in the example embodiment of the invention.

The function of the continuous searching portion 17 is mainly to obtain the feature points of a dotted lane marker 13 formed by Botts' dots or the like. The continuous searching portion 17 searches for the feature points 8 and 9 to detect the road lane markers 6 and 7 on the left and right sides of the host vehicle 20, in each row of pixels 16 in the width direction of the road in the predetermined region 15. The continuous searching portion 17 searches the rows of pixels 16 continuously in the length direction of the road, as shown in the example in FIG. 7. The continuous searching portion 17 searches for the feature points 8 and 9 in each row of pixels 16, from the farthest portion toward the nearest portion, in the predetermined region 15. As a result, all of the pixels in the predetermined region 15 are searched in the search for the feature points 8 and 9. Therefore, the search for the feature points 8 and 9 is a high density search. Incidentally, on a curved road, the curvature as viewed in the captured image seems to increase farther away from the host vehicle. Therefore, the search for the feature points is conducted starting from the portion where the curvature appears large. Thus, the search is conducted for feature points in each row of pixels from the farthest portion toward the nearest portion, so even if the number of obtained feature points reaches an upper limit value before the search of the nearest portion is complete, the effect from not being able to obtain the remaining feature points can be kept to a minimum. The continuous searching portion 17 performs a morphological operation to search for the feature points 8 and 9. A morphological operation is well-known technology that is described in detail in "Morphology" (Corona Publishing Co., Ltd.), for example. In a morphological operation, it is possible to selectively extract only structures equal to or less than a specified size from the original image (a binary image or a gray image) by a collective logic operation that uses pre-established constituent elements. In the morphological operation, structures that are equal to or less than a specified size in the width direction of the road are typically extracted. When the dotted lane marker 13 formed by the Botts' dots 12 is the object to be detected, the size of the structural elements is set to match the 10 cm diameter of the Botts' dots 12. In this case, the continuous searching portion 17 can detect structures that are equal to or smaller than the size of the Botts' dots 12. As a result of the search, the continuous search portion 17 obtains the feature points of the dotted lane marker 13 (i.e., the feature points 9 in the example in FIG. 8). Also, the feature points of the line lane marker 14 (i.e., the feature points 8 in the example shown in FIG. 8) are also obtained if the width of the line lane marker 14 such as the white line or the like is equal to or less than the width of the Botts' dots 12.

The storing portion 4 stores information (such as the location and the like) related to the feature points 8 and 9 obtained by the feature point obtaining portion 3. The storing portion 4 includes a first storage area 10 in which the feature points 8 of the road lane marker 6 on the left side of the host vehicle 20 are stored, and a second storage area 11 in which the feature points 9 of the road lane marker 7 on the right side of the host vehicle 20 are stored.

The number of feature points 8 that can be stored in the first storage area 10 and the number of feature points 9 that can be stored in the second storage area 11 are set independently of one another. The first storage area 10 has a storage capacity large enough so that it will not become full even if the road lane marker 6 on the left side of the host vehicle 20 is a line lane marker 14 and the continuous searching portion 17 obtains the feature points 8 from the farthest portion to the nearest portion of that line lane marker 14. Also, the second storage area 11 has a storage capacity large enough so that it will not become full even if the road lane marker 7 on the right side of the host vehicle 20 is a line lane marker 14 and the continuous searching portion 17 obtains the feature points 8 from the farthest portion to the nearest portion of that line lane marker 14. The number of feature points 8 that can be stored in the first storage area 10 and the number of feature points 9 that can be stored in the second storage area 11 may be set the same, for example.

The lane marker detecting portion 5 detects the road lane marker 6 based on the feature points 8 read from the storing portion 4, and detects the road lane marker 7 based on the feature points 9 read from the storage portion 4.

Figure 9:
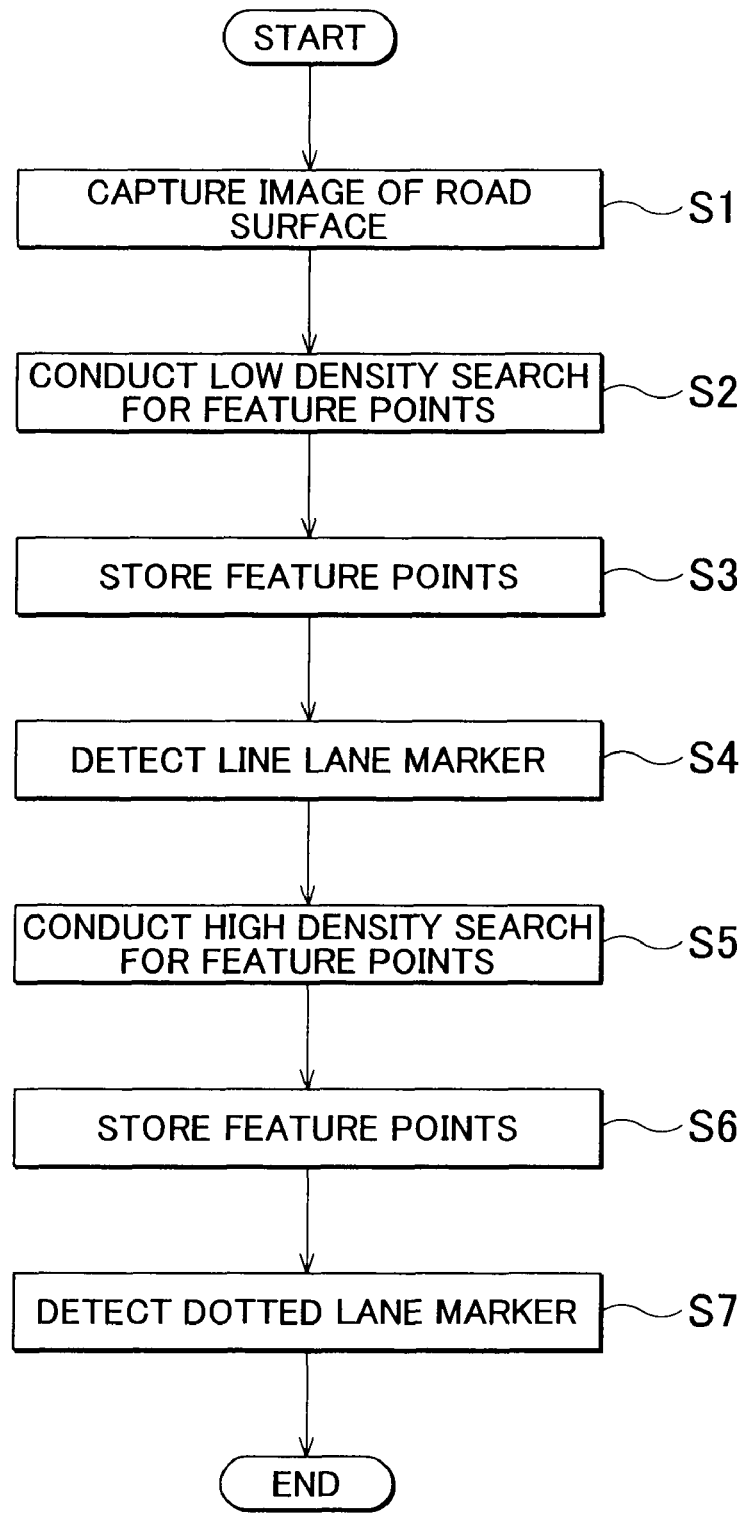
FIG. 9 is a flowchart illustrating the operation of the road lane marker detection apparatus according to the example embodiment.

Next, the operation of the road lane marker detection apparatus 1 will be described with reference to the flowchart in FIG. 9.

First, the imaging portion 2 captures an image of the road surface so that the road lane marker 6 on the left side of the host vehicle 20 and the road lane marker 7 on the right side of the host vehicle 20 are both in the image (step S1).

Next, the discontinuous searching portion 18 searches for the feature points 8 and 9 in each row of pixels 16 in the width direction of the road in the predetermined region 15 that includes the road lane marker 6 on the left side of the host vehicle 20 and the road lane marker 7 on the right side of the host vehicle 20 in the captured image (step S2). The discontinuous searching portion 18 searches the rows of pixels 16 discontinuously (discretely) in the length direction of the road. Thus, the search for the feature points 8 and 9 is a low density search. The feature point obtaining portion 3 searches for the feature points 8 and 9 in each row of pixels 16 from the farthest portion toward the nearest portion in the predetermined region 15.

Next, the storing portion 4 stores the feature points 8 and 9 obtained by the discontinuous searching portion 18 (step S3). The feature points 8 of the road lane marker 6 on the left side of the host vehicle 20 are stored in the first storage area 10 and the feature points 9 of the road lane marker 7 on the right side of the host vehicle 20 are stored in the second storage area 11. As described above, the first storage area 10 has a storage capacity large enough so that it will not become full even if the road lane marker 6 on the left side of the host vehicle 20 is a line lane marker 14 and the continuous searching portion 17 obtains the feature points 8 from the farthest portion to the nearest portion of that line lane marker 14. Also, the second storage area 11 has a storage capacity large enough so that it will not become full even if the road lane marker 7 on the right side of the host vehicle 20 is a line lane marker 14 and the continuous searching portion 17 obtains the feature points 8 from the farthest portion to the nearest portion of that line lane marker 14. Accordingly, when the feature points 8 and 9 are obtained from the farthest portion to the nearest portion by the discontinuous searching portion 18, even if one of the road lane marker 6 on the left side of the host vehicle 20 or the road lane marker 7 on the right side of the host vehicle 20 is the dotted lane marker 13 and the other is the line lane marker 14, the first storage area 10 and the second storage area 11 will not become full.

Next, the lane marker detecting portion 5 detects the road lane marker 6 based on the feature points 8 read from the first storage area 10, and detects the road lane marker 7 based on the feature points 9 read from the second storage area 11 (step S4). Because the search for the feature points 8 and 9 conducted by the discontinuous searching portion 18 is a low density search, only the feature points of the line lane marker 14 are usually detected. Therefore, only the feature points of the line lane marker 14 are stored in the first storage area 10 and the second storage area 11. Accordingly, in step S4, the lane marker detecting portion 5 detects only the line lane marker 14. In the example shown in FIG. 6, only the road lane marker 6 on the left side is detected.

Next, the continuous searching portion 17 searches for the feature points 8 and 9 in each row of pixels 16 in the width direction of the lane in the predetermined region 15 (step S5). The continuous searching portion 17 searches the rows of pixels 16 continuously in the length direction of the road. As a result, all of the pixels in the predetermined region 15 are searched in the search for the feature points 8 and 9. That is, the search for the feature points 8 and 9 is a high density search.

Next, the storing portion 4 stores the feature points 8 and 9 obtained by the continuous searching portion 17 (step S6). The feature points 8 of the road lane marker 6 on the left side of the host vehicle 20 are stored in the first storage area 10 and the feature points 9 of the road lane marker 7 on the right side of the host vehicle 20 are stored in the second storage area 11. As described above, the first storage area 10 has a storage capacity large enough so that it will not become full even if the road lane marker 6 on the left side of the host vehicle 20 is a line lane marker 14 and the continuous searching portion 17 obtains the feature points 8 from the farthest portion to the nearest portion of that line lane marker 14. Also, the second storage area 11 has a storage capacity large enough so that it will not become full even if the road lane marker 7 on the right side of the host vehicle 20 is a line lane marker 14 and the continuous searching portion 17 obtains the feature points 8 from the farthest portion to the nearest portion of that line lane marker 14. Accordingly, when the feature points 8 and 9 are obtained from the farthest portion to the nearest portion by the continuous searching portion 17, even if one of the road lane marker 6 on the left side of the host vehicle 20 or the road lane marker 7 on the right side of the host vehicle 20 is the dotted lane marker 13 and the other is the line lane marker 14, the first storage area 10 and the second storage area 11 will not become full.

Next, the lane marker detecting portion 5 detects the road lane marker 6 based on the feature points 8 read from the first storage area 10, and detects the road lane marker 7 based on the feature points 9 read from the second storage area 11 (step S7). Because the search for the feature points 8 and 9 conducted by the continuous searching portion 17 is a high density search, the feature points of both the line lane marker 14 and the dotted lane marker 13 are detected. Therefore, the feature points of both the line lane marker 14 and the dotted lane marker 13 are stored in the first storage area 10 and the second storage area 11. Accordingly, in step S7, the lane marker detecting portion 5 detects both the line lane marker 14 and the dotted lane marker 13. In the example shown in FIG. 8, the lane marker detecting portion 5 detects both the road lane marker 6 on the left side of the host vehicle 20 and the road lane marker 7 on the right side of the host vehicle 20. Incidentally, the operation for detecting the line lane marker 14 in step S7 may also be omitted because the line lane marker 14 has already been detected in step S4.

Incidentally, the information related to the road lane markers 6 and 7 detected by the lane marker detecting portion 5 is output to a handling assist portion or the like, not shown, and used to assist with driving or the like.

As described above, the storing portion 4 of the road lane marker detection apparatus 1 includes the first storage area 10 in which the feature points 8 of the road lane marker 6 on the left side of the host vehicle 20 is stored and the second storage area 11 in which the feature points 9 of the road lane marker 7 on the right side of the host vehicle 20 is stored. The number of feature points 8 that can be stored in the first storage area 10 and the number of feature points 9 that can be stored in the second storage area 11 are set independently of one another. Accordingly, when the road lane marker 6 on the left side of the host vehicle 20 is a white line and the road lane marker 7 on the right side of the host vehicle 20 is formed by Botts' dots 12, for example, a sufficient number of the feature points of the Botts' dots 12 are able to be stored in the second storage area 11 regardless of the number of feature points 8 of the white line stored in the first storage area 10. Accordingly, even if the road lane marker 6 on the left side of the host vehicle 20 is a white line and the road lane marker 7 on the right side of the host vehicle 20 is formed by Botts' dots 12, the road lane marker 7 formed by Botts' dots 12 can be more reliably detected. Also, the white line has high continuity so the road lane marker detection apparatus 1 is still able to sufficiently detect the white line even if the number of obtained feature points of the white line has reached the upper limit value and some of the feature points are unable to be obtained.

Incidentally, the method used with the road lane marker detection apparatus according to the example embodiment described above involves dividing the storage area of the storing portion into a first storage area and a second area, and managing the feature points of the road lane markers on the left and right sides of the lane divided into feature points of the road lane marker on one side of the host vehicle that are stored in the first storage area and feature points of the road lane marker on the other side of the host vehicle that are stored in the second storage area. However, the invention is not limited to this. For example, the object of the invention can still be achieved by another method of dividing up the feature points of the road lane markers on the left and right sides of the lane even if the invention is not provided with the storing portion.

The invention may be used as a lane marker detection apparatus or the like that detects a dotted lane marker formed by Botts' dots or the like.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention.

What is claimed is:

1. A road lane marker detection apparatus which detects a road lane marker on a road, comprising:
   an imaging portion that captures an image of a road surface such that a left road lane marker and a right road lane marker that demarcate a lane are captured in the image;
   a feature point obtaining portion that obtains feature points of the road lane markers based on the captured image obtained by the imaging portion;
   a storing portion that stores the feature points obtained by the feature point obtaining portion; and
   a lane marker detecting portion that detects the road lane markers based on the feature points read from the storing portion,
   wherein the storing portion includes a first storage area in which the feature points of the left road lane marker are stored and a second storage area in which the feature points of the right road lane marker are stored, and the number of feature points able to be stored in the first storage area and the number of feature points able to be stored in the second storage area are set independently of one another,
   the feature point obtaining portion includes a discontinuous searching portion and a continuous searching portion,
   the discontinuous searching portion searches for the feature points in each row of pixels in a width direction of the road in a predetermined region that includes the left road lane marker and the right road lane marker in the captured image, and searches the rows of pixels discontinuously in a length direction of the road, and
   the continuous searching portion searches for the feature points in each row of pixels in the predetermined region, and searches the row of pixels continuously in the length direction of the road.

2. The road lane marker detection apparatus according to claim 1, wherein one of the left road lane marker and the right road lane marker is formed by Botts' dots or cat's eyes, and the other is formed by a white line or a yellow line.

3. The road lane marker detection apparatus according to claim 2, wherein the feature point obtaining portion searches for the feature points in each row of pixels from a farthest portion to a nearest portion in the predetermined region.

4. The road lane marker detection apparatus according to claim 3, wherein intervals of the rows of pixels searched by the discontinuous searching portion gradually become wider from the farthest portion toward the nearest portion.

5. The road lane marker detection apparatus according to claim 2, wherein intervals of the rows of pixels searched by the discontinuous searching portion gradually become wider from a farthest portion toward a nearest portion.

6. The road lane marker detection apparatus according to claim 1, wherein the feature point obtaining portion performs a morphological operation to search for the feature points.

7. The road lane marker detection apparatus according to claim 6, wherein the feature point obtaining portion searches for the feature points in each row of pixels from a farthest portion to a nearest portion in the predetermined region.

8. The road lane marker detection apparatus according to claim 7, wherein intervals of the rows of pixels searched by the discontinuous searching portion gradually become wider from a farthest portion toward a nearest portion.

9. The road lane marker detection apparatus according to claim 6, wherein intervals of the rows of pixels searched by the discontinuous searching portion gradually become wider from a farthest portion toward a nearest portion.

10. The road lane marker detection apparatus according to claim 1, wherein the feature point obtaining portion searches for the feature points in each row of pixels from a farthest portion to a nearest portion in the predetermined region.

11. The road lane marker detection apparatus according to claim 10, wherein intervals of the rows of pixels searched by the discontinuous searching portion gradually become wider from the farthest portion toward the nearest portion.

12. The road lane marker detection apparatus according to claim 1, wherein the intervals of the rows of pixels searched by the discontinuous searching portion gradually become wider from a farthest portion toward a nearest portion.

13. The road lane marker detection apparatus according to claim 2, wherein the feature point obtaining portion performs a morphological operation to search for the feature points.

14. The road lane marker detection apparatus according to claim 13, wherein the feature point obtaining portion searches for the feature points in each row of pixels from a farthest portion to a nearest portion in the predetermined region.

15. The road lane marker detection apparatus according to claim 14, wherein intervals of the rows of pixels searched by the discontinuous searching portion gradually become wider from a farthest portion toward a nearest portion.

16. The road lane marker detection apparatus according to claim 1, wherein the search performed by the discontinuous searching portion is performed prior to the search performed by the continuous searching portion.

* * * * *